US008707543B2

(12) United States Patent
Lavoie

(10) Patent No.: US 8,707,543 B2
(45) Date of Patent: Apr. 29, 2014

(54) PROCESS FOR MAKING HIGH ELECTRICAL CONDUCTIVITY ALUMINIUM PLATES

(75) Inventor: Michel Lavoie, La Baie (CA)

(73) Assignee: 9128-5270 Quebec Inc., La Baie (CA)

( * ) Notice: Subject to any disclaimer, the term of this patent is extended or adjusted under 35 U.S.C. 154(b) by 451 days.

(21) Appl. No.: 13/063,099

(22) PCT Filed: Sep. 10, 2009

(86) PCT No.: PCT/CA2009/001266

§ 371 (c)(1),
(2), (4) Date: Mar. 9, 2011

(87) PCT Pub. No.: WO2010/028495

PCT Pub. Date: Mar. 18, 2010

(65) Prior Publication Data

US 2011/0162196 A1 Jul. 7, 2011

Related U.S. Application Data

(60) Provisional application No. 61/095,726, filed on Sep. 10, 2008.

(51) Int. Cl.
*H01S 4/00* (2006.01)

(52) U.S. Cl.
USPC ............. 29/592.1; 29/526.4; 29/527.6; 83/13

(58) Field of Classification Search
USPC ........................ 29/526.4, 527.6, 592.1; 83/13
See application file for complete search history.

(56) References Cited

U.S. PATENT DOCUMENTS

| | | | | |
|---|---|---|---|---|
| 2004/0182483 | A1 | 9/2004 | Heymes et al. | |
| 2007/0209741 | A1 | 9/2007 | Carpenter et al. | |
| 2011/0162196 | A1* | 7/2011 | Lavoie | 29/592.1 |

FOREIGN PATENT DOCUMENTS

| | | | |
|---|---|---|---|
| CA | 1215940 | A1 | 12/1986 |
| CN | 100411787 | C | 8/2008 |
| EP | 0871100 | A2 | 10/1998 |
| JP | 2008052502 | A | 3/2008 |

* cited by examiner

*Primary Examiner* — Carl Arbes
(74) *Attorney, Agent, or Firm* — Norton Rose Fulbright Canada LLP; Alexandre Daoust

(57) ABSTRACT

The process can include obtaining a rectangular aluminum panel size; obtaining a cast aluminum ingot having a length and width housing said aluminum panel size; sawing the annealed aluminum ingot along its length and across its width, thereby yielding a plurality of aluminum panels having said aluminum panel size and a given plate thickness; and cutting the plates across the thickness of the aluminum panels.

13 Claims, 3 Drawing Sheets

PROCESS FOR MAKING HIGH ELECTRICAL CONDUCTIVITY ALUMINIUM PLATES

CROSS-REFERENCE TO RELATED APPLICATIONS

This application is a national phase entry of international application no. PCT/CA2009/001266 filed Sep. 10, 2009, and claims priority of U.S. provisional patent application No. 61/095,726, filed Sep. 10, 2008, by applicant, the contents of which are hereby incorporated by reference.

FIELD

The specification relates to electrically-conductive aluminium plates usable in components of large bus bar networks, such as those leading to electrodes of aluminium production plants, and more particularly to a process for making such plates.

BACKGROUND

In aluminium production plants, very high amounts of electricity are required for separating alumina into its aluminium and oxygen constituents. Typically, the electricity is fed to the electrodes using a conductor network of large aluminium beams, often having a full rectangular cross-section. These conductor networks are referred to as 'bus bars' in the field. An example of such a bus bar conductor network is shown in FIG. 1. It is desirable that the bus bars have a high electrical conductivity—approaching that of a pure aluminium crystal as much as possible—because impurities or irregularities typically negatively affect electrical resistance in the bus bars, which, in turn, results in heat generation and electrical losses. Even small losses can be relatively important due to the massive amounts of electricity being conveyed. Hence, bus bars are often made of relatively pure aluminium from the 1000's series. Use of 1375 aluminium (sometimes referred to as 1370-50), is typical.

Bus bar systems often have complex shapes, and are often made of a plurality of assembled components, including elongated straight portions connected to each other at varying angles with correspondingly large connectors referred to as 'bus rings'. While elongated straight portions can be cast as a whole, it is often more advantageous to make the connectors or bus rings from stacks of identical plates. These stacks, and the plates forming them, can have various shapes and dimensions, depending of its use in the bus bar network.

Due to the fact that they are not made from a unitary cast block, the bus rings can be the limiting factor in the overall electrical conductivity of the bus bar. The bus ring plates are thus carefully soldered into the assembly with the bus bar portions they interconnect at each end in a manner to obtain high electrical conductivity in the soldered joints, and the bus ring plates are produced in a way to optimize electrical conductivity across both connected ends thereof, while maintaining reasonable production costs. Further, the bus ring plates are typically cut into flat aluminium panels, and because the bus ring plates are used in a stacked arrangement, the planarity and thickness precision of the aluminium panels from which the bus ring plates are made of has an influence of the quality achievable in the soldered bus rings.

In the art, the elongated aluminium panels which could be used to produce plates having characteristics satisfactory for use in bus rings were made by rolling a massive cast block of aluminium, referred to as an ingot, in successive steps, until a long panel having the desired thickness was obtained. The long panel was cut into the elongated aluminium panels, and these thus had standard sizes due to the limited adaptability of the production process. Such aluminium panels made from rolled ingots were used in bus ring plate production, but suffered from some limitations which were tolerated, such as dimensional imprecision in thickness and/or planarity, and the presence of internal stress imparted by the production method, and which negatively affected the later soldering of the plates into a bus ring.

Further, when a producer of bus ring plates received a bus ring plate order, he selected an aluminium panel of one of the standard sizes appropriate to reduce loss, and determined a pattern for the bus ring plates in the aluminium panel with a view to use as much material from the selected aluminium panel. The pattern-making step is referred to in the art as nesting, and was either made manually, for simpler bus ring plate shapes, or by using a dedicated software, such as offered by LANTEC, for example. Nonetheless, there typically resulted an amount of aluminium loss on unused edges of the aluminium panel from the imperfect match between even the most optimal nesting pattern and the closest standard dimensions of the available rolled aluminium panels. There were costs associated with the unused portions of the aluminium plates, and these costs were reflected in the price and availability of bus ring plates.

Henceforth, although known bus ring plate production methods were satisfactory to a certain degree, there remained room for improvement.

SUMMARY

In accordance with one aspect, there is provided a process of making bus plates for a current-carrying bus bar assembly, the process comprising: a. Obtaining a rectangular aluminium panel size; b. Obtaining an annealed aluminium ingot having a length and width specifically sized to house said aluminium panel size; c. Sawing the annealed aluminium ingot along its length and across its width, thereby yielding a plurality of aluminium panels having said aluminium panel size and a given bus plate thickness; d. Cutting the bus plates across the thickness of the aluminium panels.

In accordance with one aspect, there is provided a process of making bus plates for a current-carrying bus bar assembly, the process comprising: a. Determining a two-dimensional nested pattern of said bus plates and a corresponding rectangular aluminium panel size in which said two-dimensional nested pattern is contained; b. Obtaining a cast aluminium ingot having a length and width specifically sized to house said aluminium panel size; c. Sawing the aluminium ingot along its length and across its width, thereby yielding a plurality of aluminium panels having said aluminium panel size and a given bus plate thickness; d. Cutting the bus plates across the thickness of the aluminium panels according to said two-dimensional nesting pattern.

In accordance with another aspect, there is provided a process of making high electrical conductivity plates for use in a stacked arrangement as part of a component of an electrical conductor network, the process comprising: Obtaining a non-overlapping nested two-dimensional pattern of shapes of said plates, Selecting a width and length of a rectangular aluminium panel size appropriate for housing said nested two-dimensional pattern with a low amount of waste; Obtaining a cast and subsequently annealed aluminium ingot width and length selected to house aluminium panels having the selected rectangular panel size; Sawing a crust off faces of said ingot; Sawing said ingot into a plurality of rectangular aluminium panels having the rectangular aluminium panel size; and Cutting said nested two-dimensional pattern of plates into said panels, thereby yielding the plates.

In accordance with another aspect, there is provided a process of making high electrical conductivity plates for use in a stacked arrangement in a connector of a large conductor network, including cutting the plates from aluminum panels having given planarity tolerances, the process being characterized in that a size of the aluminium panels is determined based on a previously determined nesting pattern of plates, and in that it comprises obtaining an ingot having a size corresponding to the determined aluminum panel size.

In accordance with another aspect, there is provided a plate obtained from a process such as described above.

In accordance with another aspect, there is provided a use of a plurality of plates obtained from a process such as described above in a stacked arrangement in a bus ring.

DESCRIPTION OF THE FIGURES

In the appended figures.

DETAILED DESCRIPTION

Figure 1:
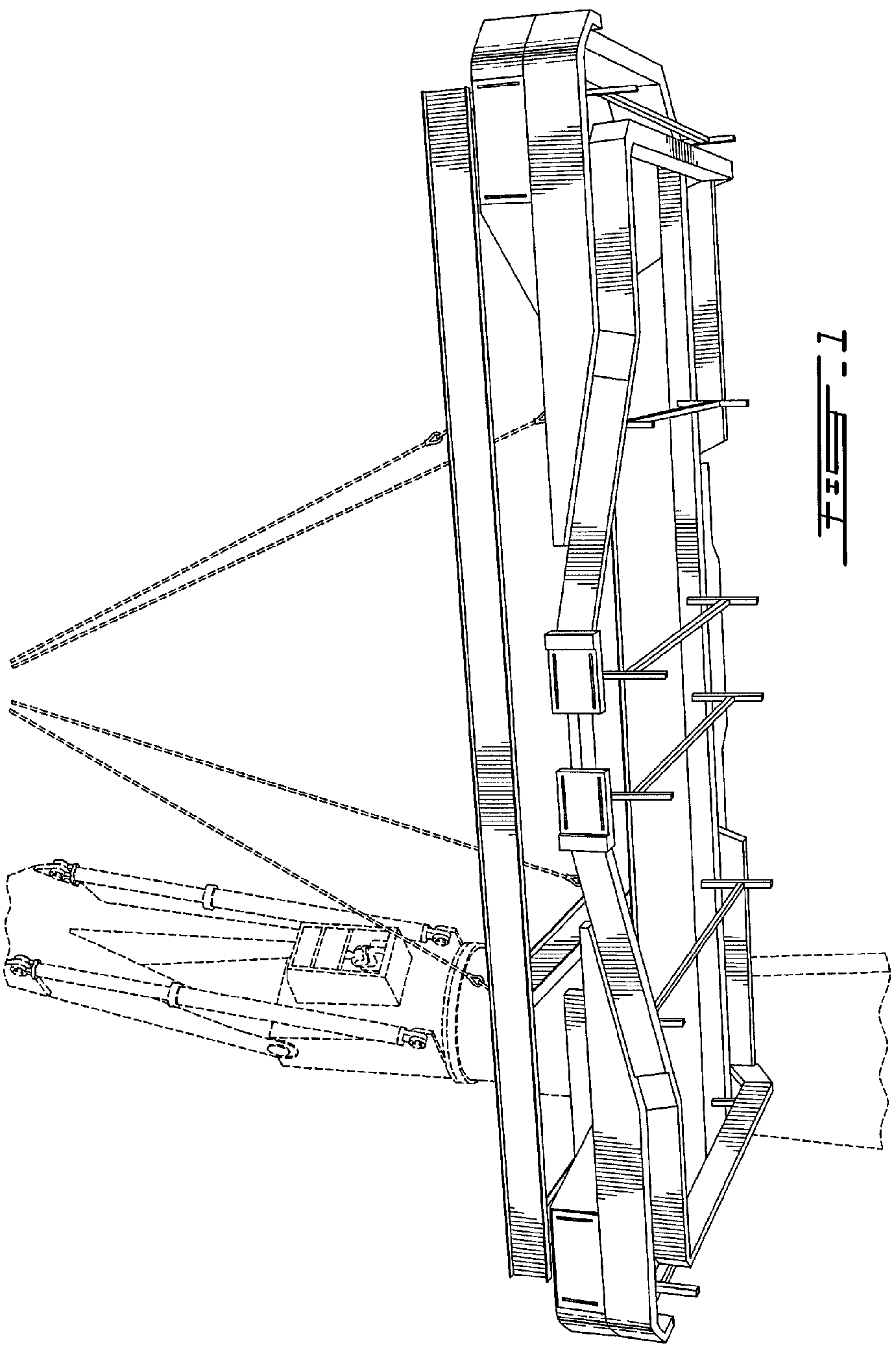
FIG. 1 shows a bus bar conductor network, in accordance with the prior art.
Figure 2:
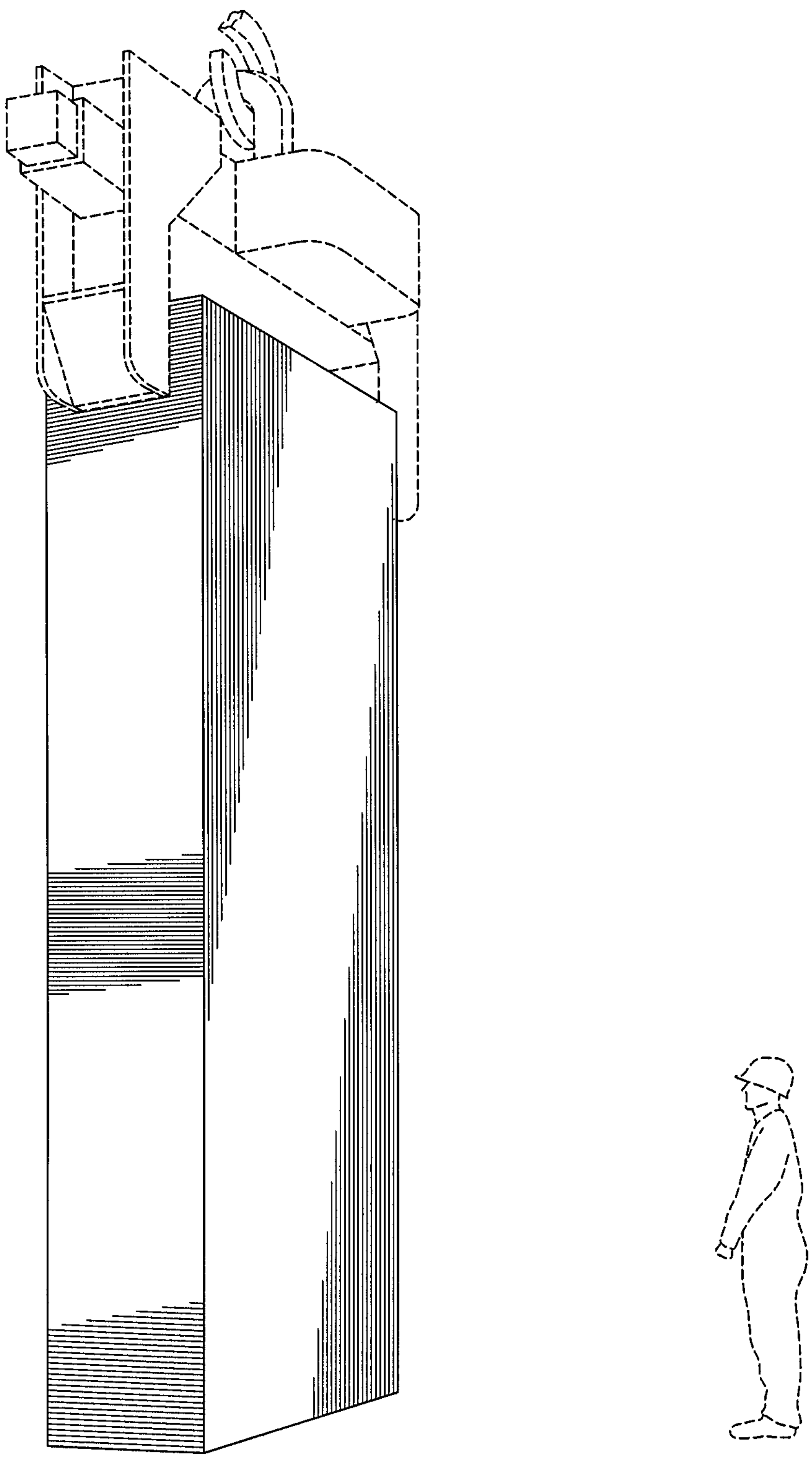
FIG. 2 shows a ingot.
Figure 3:
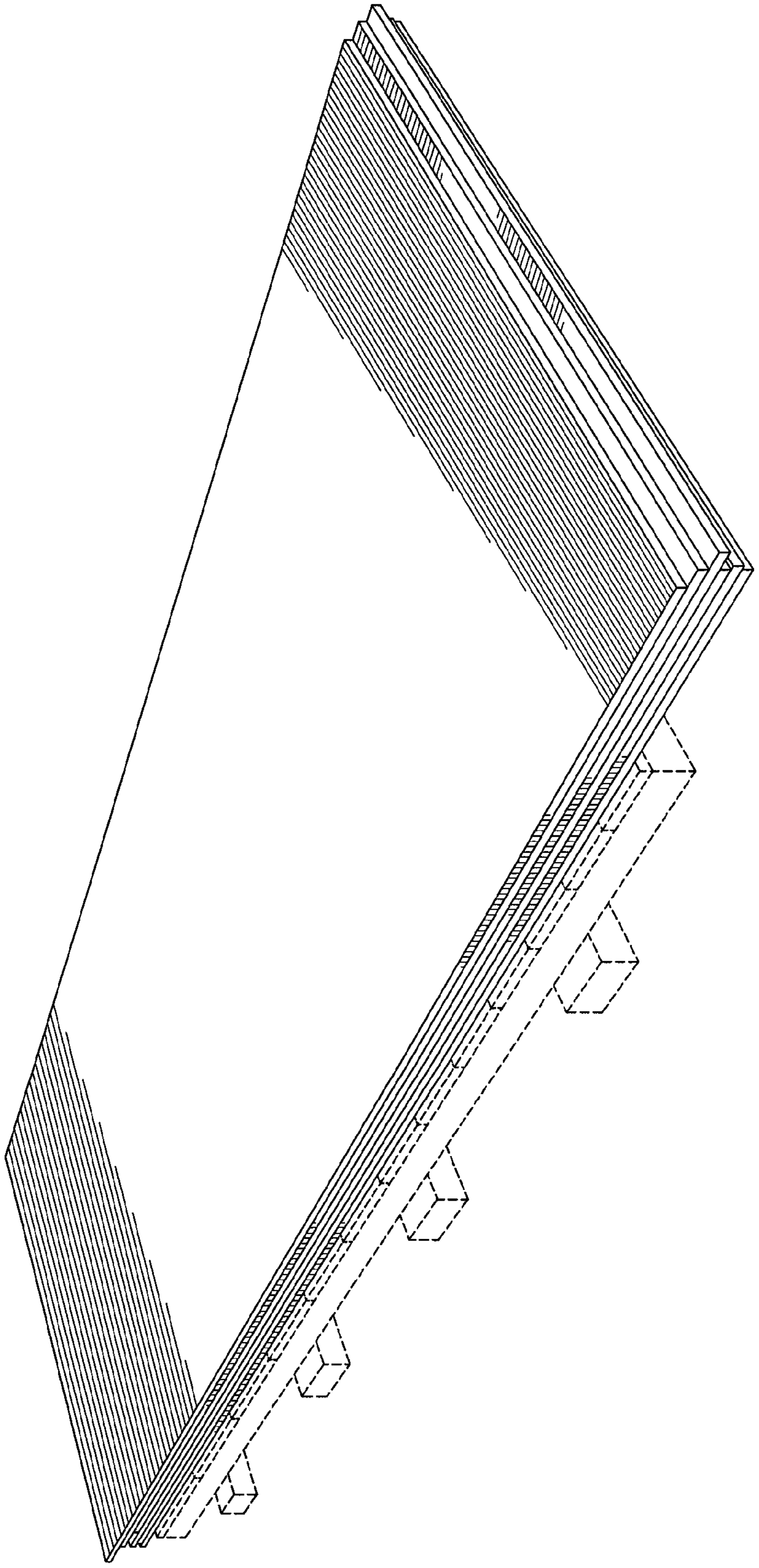
FIG. 3 shows aluminum panels obtained from sawing the ingot of FIG. 2.

Typically, an order of bus ring plates is received by the producer. The order typically requests a number of identical bus ring plates which are later to be used in a stacked arrangement in a bus ring. Bus rings are typically used in electrical conductor networks referred to as bus bars leading to electrodes in an aluminium production plants, such as the example shown in FIG. 1. The bus ring plate design typically has a two-dimensional shape having a given thickness, usually ranging between 5 and 50 mm (10 or 12 mm are typical). It is sought that the bus ring plates have relatively strict thickness and planarity tolerances, so that they can efficiently conduct electricity when arranged into the bus ring configuration, and that the plates have a relatively low amount of internal stress so they can be later soldered in the bus ring arrangement in a satisfactory manner.

To achieve the predetermined thickness, the two-dimensional shapes of the bus ring plates are cut in an aluminium panel having that thickness. Typically thickness tolerances of within ±0.35 mm, preferably within ±0.32 mm, within the 5-50 mm thickness range, are aimed. Planarity of within 0.9 $mm/m^2$ can be satisfactory, but planarity of within 0.4 $mm/m^2$, such as for plates of 10 or 12 mm for instance, is preferred. The two-dimensional shape of the bus ring plate design can be simply rectangular, or can have a more complex shape, such as an elbow, for example, depending of its intended final use. It will be understood that in order to reduce the amount of aluminium panels used, much attention is given to obtaining a well-nested pattern of the bus ring plates on a rectangular surface of the aluminum panel, with a desire that the nested pattern arranges the two-dimensional shapes of the bus ring plates in a manner to occupy as much area as possible in the rectangular shape, with minimal unused portions, or loss.

When the ordered bus ring plates are rectangular, obtaining the nested pattern is relatively simple—the rectangles of the different bus ring plates are simply positioned side by side and end to end until they occupy a greater rectangle of desired length and width, with a spacing corresponding to a cutting width being left between the plates. However, more complex two-dimensional shapes often require a nesting of a greater complexity. Some specialized software exists to do this, such as offered by LANTEC. Typically, the nesting pattern includes a number of cells which are repeated along the total length and width. The cells can include a single rectangular plate shape, for example, or a given nested arrangement of a number of nested plates, for example.

The producer then orders an aluminium ingot of a size which is a function of the nested pattern—i.e. the ordered aluminium ingot has a width and length which are selected to house panels from which a given number of cells of the nested pattern are repeated in width and in length, with a view to yield as little of wasted or unused aluminium on the edges as possible. Typically, when making current-carrying components, so-called "pure"aluminium is preferred due to its electrical conductivity properties, so the aluminium ingot is made from aluminium in the 1000' series. Typically, aluminium ingot producers can adjust the width, thickness, and length of their moulds relatively easily using known techniques and thereby produce ingots of any desired size within the capacity of the mould. The bus ring plate producer will typically request an aluminium ingot having the largest width possible being a multiple of the cell width in the nested pattern, given the ingot producer mould, because manipulating aluminium panels is delicate and time consuming, and obtaining a greater number of bus ring plates from each different aluminium panels typically reduces production costs as compared with dealing with a greater number of panels having a lesser number of cells.

Once the aluminium ingot is cast, tests have shown that satisfactory planarity in the resulting aluminium panels can be achieved when the aluminium ingot is annealed with a heat treatment prior to sawing. Such a heat treatment can include, for example, raising the temperature of the ingot from room temperature to 460±50° C. on a period of 4±2 hours; maintaining the temperature at 460±50° C. during 30±5 hours (the duration of this step in particular can vary depending on the size of the ingot); reducing the temperature from 460±50° C. to 250±25° C. during 14±3 hours; and subsequently removing the ingot from the annealing oven.

Another preparation step on the ingot which has been shown to result in better characteristics in the resulting aluminium panels is removing the header and the footer of the cast ingot prior to sawing into panels.

Typically, a facing layer of the ingot referred to as the crust in the art is also removed from the lateral faces of the ingot prior to sawing into panels.

Subsequently to these latter preparation steps, the prepared aluminium ingot has a width and length corresponding to the width and length of the aluminium panels, and a thickness corresponding to a number of aluminium panels each having the required bus ring plate thickness. The prepared aluminium ingot is then sliced into panels longitudinally. The sawing is effected using appropriate blade and lubricant. Adjusting the speed of advancement of the blade in the ingot has been shown to affect planarity.

A number of aluminium panels can thus be obtained by sawing subsequent slices of the aluminium ingot. These panels each have a width and length which can be selected as a function of the nesting pattern which was initially determined for the specific order of bus ring plates. The bus ring plates are cut into the aluminium panels using any satisfactory process, according to the determined nested pattern. Because the width and length of the aluminium panels can be determined as a function of the initially determined nesting pattern, one can achieve a relatively low amount of unused portions, ideally a negligible amount.

Accordingly, the aluminium ingot can be used with a greater efficiency in making the high-conductivity aluminium plates which can be used, for example, in making bus rings of conductive bus bar networks leading to electrodes in aluminium production plants.

Further, obtaining the aluminium panels by sawing instead of rolling has achieved producing plates with better thickness and planarity tolerances, and having reduced amounts of internal stress, which facilitates the subsequent welding operation into the electrical conductor.

EXAMPLE

A 1370-50 aluminium ingot having dimensions of 1711 mm×1956 mm×3785 mm was ordered. It was annealed by raising temperature from 20° C. to 460° C. during 4 hours, maintaining temperature at 460° C. during 30 hours, reducing temperature from 460° C. to 250° C. during 14 hours, and removing the ingot from the oven, thereby returning it to ambient temperature.

A first sawing step was to remove the header and the footer of the ingot, and the crust on all faces was removed as well.

Aluminium panels having 76.5 inches×175 inches were then machined from the ingot by sawing using a laser guided band saw. The band saw blade was a 2006 model band saw blade form the company SERMAS having a 2 meter height capacity (4.5 m length) and a ratio of two coarse teeth for each finishing tooth. The blade was oriented transversally across the width of the ingot, and displaced longitudinally relatively to the ingot. The sawing was done using CAL 950™ lubricant from the company MAGNUS. It was aimed to obtain aluminium panels having a thickness of 12 mm. The blade was fed at 2800 m/min. and advanced at 115 mm/min. The thickness achieved was between 11.86 and 12.08 mm, and the planarity achieved was between 0.35 and 0.40 mm measured at 9 spaced-apart locations on each of six 1 square meter zones.

The above example is given for illustrative purposes only. Alternate embodiments can be realized. For instance, the high electrical conductivity plates obtained from a process such as described above can be used in any electrolytic cell or system that uses electrical conductors made of an assembly because of complex shapes and size of the conductor network. The scope is thus indicated by the appended claims.

What is claimed is:

1. A process of making bus plates for a current-carrying bus bar assembly, the process comprising:

a. Obtaining a rectangular aluminium panel size;

b. Obtaining an annealed aluminium ingot having a length and width specifically sized to house said aluminium panel size;

c. Sawing the annealed aluminium ingot along its length and across its width, thereby yielding a plurality of aluminium panels having said aluminium panel size and a given bus plate thickness;

d. Cutting the bus plates across the thickness of the aluminium panels.

2. The process of claim 1, further comprising removing a header and footer of the aluminium ingot prior to said sawing.

3. The process of claim 1, further comprising obtaining a two-dimensional nested pattern of said bus plates, wherein the rectangular panel size obtained in step a. is selected to contain the two-dimensional nested pattern.

4. The process of claim 3, wherein in step d. the bus plates are cut according to said two-dimensional nesting pattern.

5. The process of claim 1, wherein step b. includes casting the aluminium ingot, the casting including adapting the width of a mould for the aluminium ingot to house the width of the rectangular aluminium panel size.

6. The process of claim 1, wherein step b. includes annealing the aluminium ingot, the annealing including in sequence: raising the temperature of the ingot from room temperature to 460±50° C. on a period of 4±2 hours; maintaining the temperature at 460±50° C. during 30±5 hours; reducing the temperature from 460±50° C. to 250±25° C. during 14±3 hours; and returning the ingot to room temperature.

7. The process of claim 1, further comprising removing a crust of said cast aluminium ingot prior to said sawing.

8. The process of claim 1 wherein said aluminium ingot is of aluminium from the 1000' series.

9. The process of claim 1 wherein the aluminium panels have a thickness between 5 mm and 50 mm.

10. The process of claim 9 wherein the thickness of the aluminium panels is within a tolerance of 0.35 mm.

11. The process of claim 9 wherein the aluminium panels have a planarity of within 0.9 mm/m2.

12. The process of claim 1, further comprising assembling a plurality of said plates in a stacked arrangement into a bus bar component.

13. The process of claim 1, further comprising soldering at least one of said plates to other components of a bus bar.

* * * * *